United States Patent
Shinohara

(10) Patent No.: US 10,447,879 B1
(45) Date of Patent: Oct. 15, 2019

(54) IMAGE FORMING APPARATUS AND IMAGE FORMING METHOD

(71) Applicant: TOSHIBA TEC KABUSHIKI KAISHA, Tokyo (JP)

(72) Inventor: Eiji Shinohara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/199,062

(22) Filed: Nov. 23, 2018

(51) Int. Cl.
*H04N 1/00* (2006.01)

(52) U.S. Cl.
CPC ..... *H04N 1/00896* (2013.01); *H04N 1/00936* (2013.01); *H04N 2201/0094* (2013.01)

(58) Field of Classification Search
CPC .................................................. H04N 1/00936
See application file for complete search history.

(56) References Cited

U.S. PATENT DOCUMENTS

| 2008/0138098 | A1* | 6/2008 | Wegman ............ G03G 15/55 399/12 |
| 2016/0357126 | A1* | 12/2016 | Kim .................. G03G 15/0886 |
| 2017/0230540 | A1 | 8/2017 | Sasaki |

* cited by examiner

*Primary Examiner* — Lennin R Rodriguezgonzalez
(74) *Attorney, Agent, or Firm* — Kim & Stewart LLP

(57) ABSTRACT

An image forming apparatus includes a sensor configured to detect an object within a predetermined range, a storage unit that stores information about the detected object, and a controller. The controller is configured to control the sensor to detect the object when the image forming apparatus is in a first mode, and in response to the detection of the object, store the information indicating that the object is detected. In response to transition from the first mode to a second mode in which power consumption is higher than the first mode, when the information indicates that the object is detected, the controller performs authentication of a developer cartridge attached to the image forming apparatus, and when the information does not indicate that the object is detected, the controller skips the authentication of the developer cartridge.

20 Claims, 5 Drawing Sheets

| DEVELOPER CARTRIDGE | IDENTIFICATION INFORMATION | MODEL NUMBER | COLOR | DECOLORABLE |
|---|---|---|---|---|
| CARTRIDGE 1 | AAA | 111 | ○○ COLOR | NO |
| CARTRIDGE 2 | BBB | 222 | ×× COLOR | NO |
| CARTRIDGE 3 | CCC | 333 | △△ COLOR | YES |
| ⋮ | ⋮ | ⋮ | ⋮ | ⋮ |

| FLAG | DETECTION TIME |
|---|---|
| STATE TRANSITION NOTIFICATION | 2018:07:23:15:00:00 |
| APPROACH DETECTION | 2018:07:23:16:00:25 |
| ⋮ | ⋮ |
| APPROACH DETECTION | 2018:07:23:16:03:30 |
| STATE TRANSITION NOTIFICATION | 2018:07:23:16:06:50 |

US 10,447,879 B1

IMAGE FORMING APPARATUS AND IMAGE FORMING METHOD

FIELD

Embodiments described herein relate generally to an image forming apparatus and an image forming method.

BACKGROUND

Recording media, such as radio frequency identifier (RFID) tags or integrated circuit (IC) chips, are mounted in developer cartridges used in image forming apparatuses such as multi-function peripherals (MFPs). In the recording media, information for authenticating the developer cartridges is recorded as identification information. Based on the identification information stored in the recording media, the MFPs can determine whether the developer cartridges attached thereto are genuine, i.e., manufactured and shipped by authorized manufacturers.

However, in a power-saving state such as a sleep mode, the MFPs cannot detect whether the developer cartridges have been exchanged. Thus, it is necessary for the MFPs to determine whether the developer cartridges are genuine whenever the power-saving state transitions to a normal state. Therefore, in the MFPs, it may take some time to cause the power-saving state to transition to the normal state.

DETAILED DESCRIPTION

In general, according to one embodiment, an image forming apparatus comprises a sensor configured to detect an object within a predetermined range, a storage unit that stores information about the detected object, and a controller. The controller is configured to control the sensor to detect the object when the image forming apparatus is in a first mode, and in response to the detection of the object, store the information indicating that the object is detected. In response to transition from the first mode to a second mode in which power consumption is higher than the first mode, when the information indicates that the object is detected, the controller performs authentication of a developer cartridge attached to the image forming apparatus, and when the information does not indicate that the object is detected, the controller skips the authentication of the developer cartridge.

An embodiment provides an image forming apparatus and an image forming method capable of reducing a transition time from a power-saving state to a normal state.

Hereinafter, an image forming apparatus and an image forming method according to an embodiment will be described with reference to the drawings.

Figure 1:
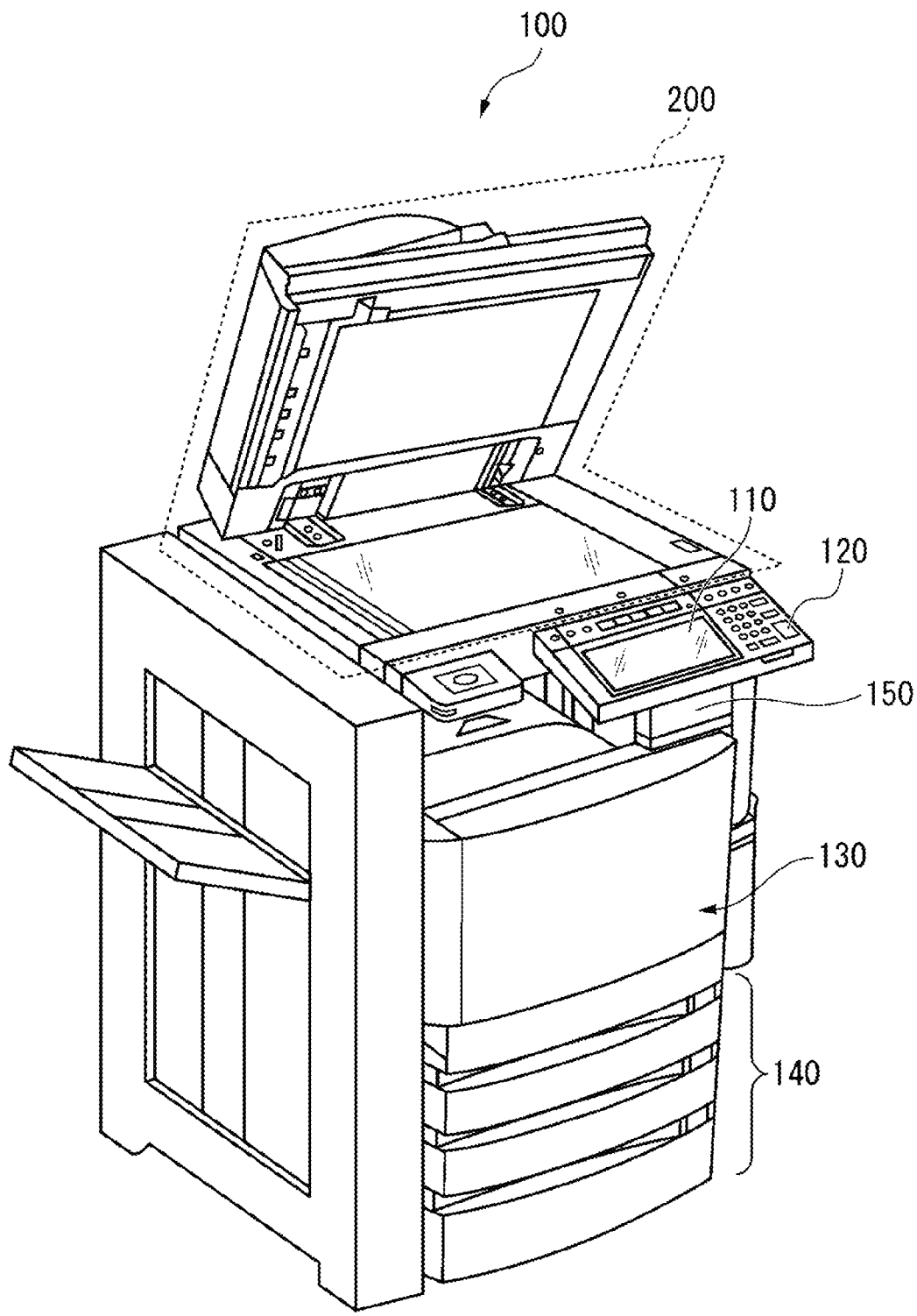
FIG. 1 is an external view of an image forming apparatus according to an embodiment.

FIG. 1 is an external view of an image forming apparatus 100 according to an embodiment. The image forming apparatus 100 is, for example, a multi-function peripheral. The image forming apparatus 100 includes a display 110, a control panel 120, a printer 130, a plurality of sheet trays 140, a sensor 150, and an image scanner 200. The printer 130 of the image forming apparatus 100 may be an electrophotographic apparatus that fixes a toner image on a sheet or may be an inkjet apparatus.

The image forming apparatus 100 forms an image on a sheet using a developer such as toner. The sheet is, for example, a paper or a label paper. The sheet may be any object as long as the image forming apparatus 100 can form an image on a surface of the sheet.

The display 110 is an image display device such as a liquid crystal display or an electro-luminescence (EL) display. The display 110 displays various kinds of information regarding the image forming apparatus 100.

The control panel 120 includes a plurality of buttons. The control panel 120 receives an operation by a user. The control panel 120 outputs a signal in accordance with an operation performed by the user to a controller 600 of the image forming apparatus 100. The display 110 and the control panel 120 may be integrated as a touch panel.

The printer 130 forms an image on a sheet based on image information generated by the image scanner 200 or image information received via a communication path. The printer 130 forms an image through, for example, the following process. An image forming unit of the printer 130 forms an electrostatic latent image on a photoconductive drum based on the image information. The image forming unit of the printer 130 forms a visible image by attaching a developer on the electrostatic latent image. In an embodiment, the developer is toner. A transfer unit of the printer 130 transfers the visible image to the sheet. A fixer 50 of the printer 130 fixes the visible image on the sheet by heating and pressurizing the sheet. The sheet on which the image is formed may be a sheet accommodated in the sheet trays 140 or may be a sheet loaded by a hand.

Figures 2, 3:
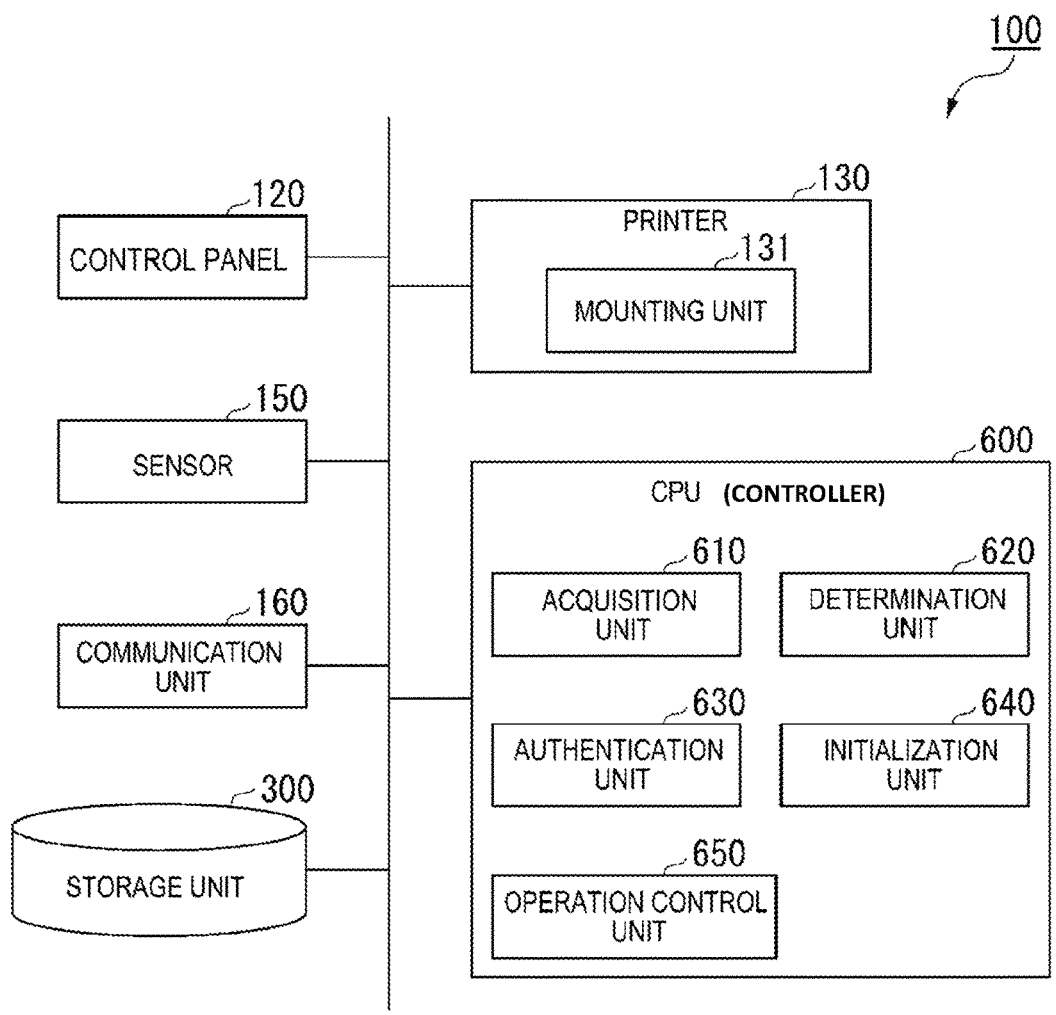
FIG. 2 is a block diagram of the image forming apparatus according to the embodiment.
FIG. 3 shows an identification information table according to the embodiment.

The printer 130 includes a mounting unit 131 on which a developer cartridge to be described below with reference to FIG. 2 is mounted.

The sheet trays 140 store sheets which are used to form images in the printer 130.

The toner may be decolorable toner, non-decolorable toner (normal toner), decorative toner, and the like. The decolorable toner has a property in which color is decolored by external stimuli. The "decolorable" means that an image formed on a sheet using a certain color (including not only chromatic color but also achromatic color such as white and black), which is different from the sheet color, can be made invisible under a certain condition. For example, the external stimuli include heating, lighting with a specific wavelength, and applying a pressure. In the embodiment, decolorable toner is decolored when its temperature is equal to or greater than a specific temperature. The decolorable toner is colored when the temperature is equal to or less than a specific restoration temperature after the decolorable toner is decolored.

Any toner may be used as long as the decolorable toner has the above-described properties. For example, a coloring material of the decolorable toner may be a leuco dye. The decolorable toner, a developing agent, a decolorable agent, a discoloration-temperature regulator, and the like may be appropriately combined.

The sensor 150 detects whether a target object is within a detection range of the sensor 150. The target object differs depending on the type of sensor 150. For example, when the sensor 150 is an infrared sensor, the target object is a living thing that gives off heat, such as humans or animals. For example, when the sensor 150 is an optical sensor, the target object is an object that blocks light output by the optical sensor. For example, when the sensor 150 is an image sensor, the target object may be an object having a predetermined shape, such as a human body. When a target object is within the detection range, the sensor 150 informs the image forming apparatus 100 that the target object is detected. The sensor 150 is not necessarily limited to the above-described specific examples of the sensor. The sensor 150 may detect a target object using a structure of an acoustic sensor, a sound sensor, a touch sensor, or the like.

The image scanner 200 reads image information of a reading target as lightness and darkness of light. The image scanner 200 records the read image information. The recorded image information may be transmitted to another information processing device via a network. The recorded image information may be formed as an image on a sheet by the printer 130. The image scanner 200 may include an auto document feeder (ADF).

FIG. 2 is a block diagram of the image forming apparatus 100 according to the embodiment. The image forming apparatus 100 includes the control panel 120, the printer 130, the sensor 150, a communication unit 160, a storage unit 300, and a controller 600. The description of the control panel 120, the printer 130, and the sensor 150 described above in FIG. 1 will not be repeated.

The image forming apparatus 100 operates in at least one of a power-saving state and a normal state. The normal state is a state in which the image forming apparatus 100 can form an image or the like. The power-saving state is a state in which power consumption is less than in the normal state by limiting some of the functions operating in the normal state. For example, in the power-saving state, the image forming apparatus 100 stops energization to the control panel 120 and the printer 130 in which power consumption is large. In the embodiment, the sensor 150, the communication unit 160, the storage unit 300, and the controller 600 are energized even in the power-saving state to be operable.

The mounting unit 131 mounts a developer cartridge in the printer 130. The mounting unit 131 can correctly mount the developer cartridge in the printer 130 only when the shape of the developer cartridge fits with the mounting unit 131.

The communication unit 160 is a communication interface. The communication unit 160 communicates with an information processing apparatus such as a personal computer (PC) and a smartphone or a portable terminal such as a tablet via a network 900.

The storage unit 300 is configured using a storage device such as a magnetic hard disc device or a semiconductor storage device. The storage unit 300 stores an identification information table of a developer cartridge. The identification information table of the developer cartridge is a data table for identifying a developer cartridge which is used by the image forming apparatus. The developer cartridge is a container that contains a developer. The storage unit 300 stores a detection history table. The detection history table is a data table that stores a flag and a time at which the flag is detected. The identification information table will be described below with reference to FIG. 3. The detection history table will be described below with reference to FIG. 4.

The storage unit 300 stores information that indicates presence or absence of setting whether a state automatically returns from the power-saving state to the normal state when the sensor 150 detects a target object (hereinafter referred to as "return setting"). The storage unit 300 may store information other than the foregoing information. In the following embodiments, it is assumed that the return setting is not recorded.

FIG. 3 shows the identification information table according to the embodiment.

The storage unit 300 stores, for example, the identification information table illustrated in FIG. 3 in advance. The identification information table has identification information for identifying a developer cartridge. The identification information table stores information regarding a developer and a developer cartridge such as "identification information," "model number," "color," and whether the developer is "decolorable" or not, as data items for identifying the developer cartridge.

The "identification information" is identification information recorded on a recording medium included in the developer cartridge. For example, the identification information is a character string such as an encryption key and a password. The "model number" is a model number of a developer cartridge associated with the identification information. The "color" is color of the developer associated with the identification information. The "decolorable" is information indicating whether the developer associated with the identification information is decolorable toner. The "decolorable" indicates "yes" when the developer is decolorable toner. The "decolorable" indicates "no" when the developer is not decolorable toner. In the identification information table, at least identification information is stored in advance for each developer cartridge.

The description will be made using a specific example. In the example illustrated in FIG. 3, columns of the identification information table are "developer cartridge," "identification information," "model number," "color," and "decolorable." "Identification information" of developer cartridge 1 is "AAA." "Model number" of developer cartridge 1" is "111." "Color" of developer cartridge 1 is "00 color." "Decolorable" of developer cartridge 1 is "no." The identification information table has information according to the column for each developer cartridge.

The identification information table is a data table in which information regarding genuine developer cartridge is stored in advance. Accordingly, the authentication unit 630 can authenticate whether the developer cartridge is genuine by comparing the identification information table to the identification information of the developer cartridge.

The identification information table illustrated in FIG. is merely one specific example. Therefore, the identification information table may be configured in a different mode from FIG. 3. For example, the identification information table may also have a column of a model number of an MFP to be used.

Figures 4, 5:
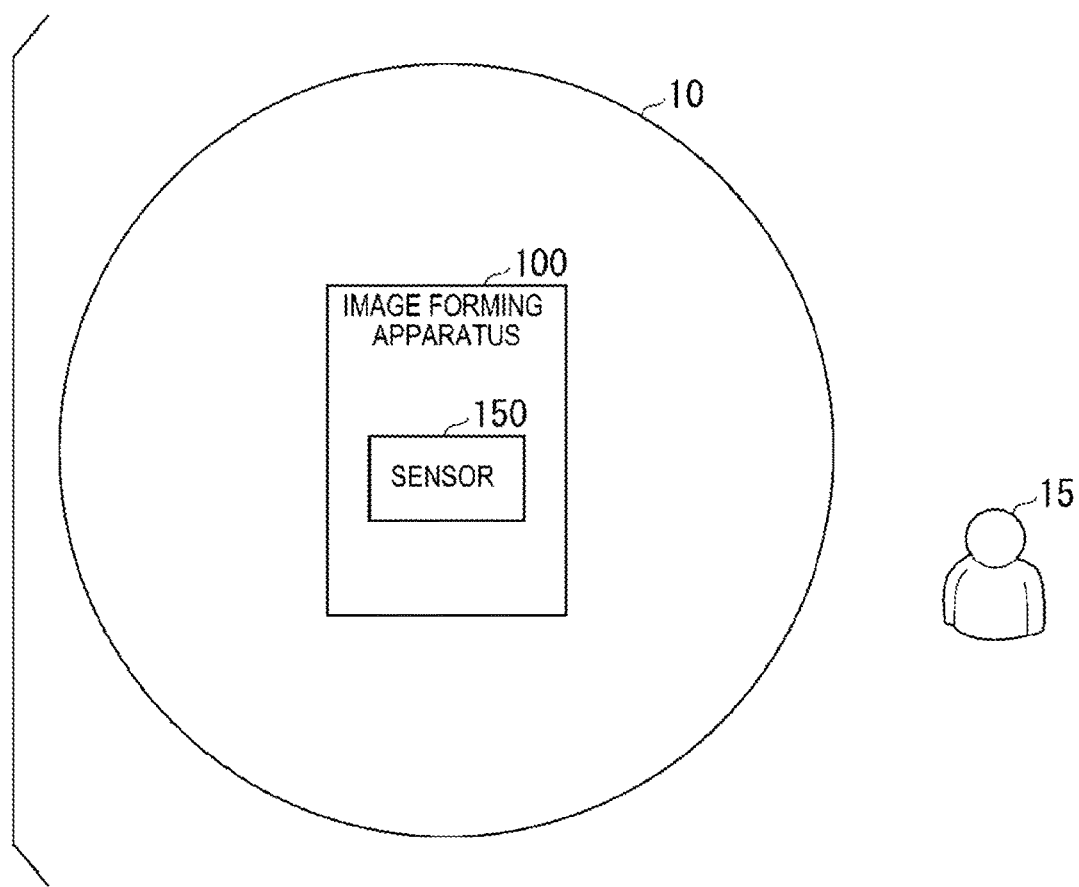
FIG. 4 shows a detection history table according to the embodiment.
FIG. 5 is a diagram of a method of detecting a user using a sensor according to the embodiment.

FIG. 4 shows a detection history table according to the embodiment.

The storage unit 300 stores, for example, the detection history table illustrated in FIG. 4. In the detection history table, information regarding a flag and a detection time is stored. The flag is "approach detection" and "state transition notification." "Approach detection" is a flag indicating that the sensor 150 detects a target object. "State transition notification" is a flag generated when a notification received when the normal state transitions to the power-saving state and when the power-saving state transitions to the normal state. A notification for transitioning from the power-saving state to the normal state is generated based on a print instruction command or printing data transmitted from an information processing apparatus such as a PC or a terminal apparatus such as a smartphone or a tablet, a button pressing signal of the control panel 120 by a user, or a cover opening or closing detection signal of the image forming apparatus 100. The detection time is a time acquired by the acquisition unit 610 at the time of storing each flag when the image forming apparatus 100 is in the power-saving state. A function of the acquisition unit 610 in the power-saving state will be described below.

For example, the acquisition unit 610 acquires a time at which the flag of "state transition notification" is stored. In FIG. 4, the acquisition unit 610 stores an acquisition time "2018: 07: 23: 15: 00: 00" in the detection history table in association with "state transition notification." The acquisition unit 610 stores an acquisition time "2018: 07: 23: 16: 06: 50" in the detection history table in association with "state transition notification."

For example, the acquisition unit 610 acquires a time at which the flag of "approach detection" is stored. In FIG. 4, the acquisition unit 610 stores an acquisition time "2018: 07: 23: 16: 00: 25" in the detection history table in association with "approach detection." The acquisition unit 610 stores an acquisition time "2018: 07: 23: 16: 03: 30" in the detection history table in association with "approach detection."

In the normal state, the acquisition unit 610 acquires data of the detection history table. In FIG. 4, the flag of "approach detection" is stored during a power-saving period. Therefore, the authentication unit 630 authenticates whether the developer cartridge used in the image forming apparatus is genuine. Thereafter, an initialization unit 640 deletes data of the detection history table of FIG. 4.

The description will be made referring back to FIG. 2. The controller 600 includes a processor such as a central processing unit (CPU). In an embodiment, the processor executes a program and achieves the functions of the acquisition unit 610, the determination unit 620, the authentication unit 630, the initialization unit 640, and an operation control unit 650. The description of the content described in FIGS. 3 and 4 will not be repeated.

The acquisition unit 610 acquires data of the detection history table stored in the storage unit 300 in the normal state. The acquisition unit 610 transmits the data of the detection history table to the determination unit 620.

The acquisition unit 610 acquires a time at which the flag is stored in the detection history table in the power-saving state. In the power-saving state, the acquisition unit 610 stores a detection time of the detection history table by associating the acquisition time with a flag.

Based on a detection result of the sensor 150, the determination unit 620 determines whether a target object approaches the image forming apparatus 100 during the power-saving period. The power-saving period is a period of the power-saving state. For example, the determination unit 620 retrieves a record for which a detection time is within the power-saving period among records of the detection history table. When such a record is retrieved, the determination unit 620 determines that the target object approaches the image forming apparatus 100 during the power-saving period. Conversely, when such a record is not retrieved, the determination unit 620 determines that the target object does not approach the image forming apparatus 100 during the power-saving period. The determination unit 620 determines whether the return setting is recorded in the storage unit 300.

The authentication unit 630 authenticates whether the developer cartridge used in the image forming apparatus is genuine in an operation when the power-saving state transitions to the normal state. The authentication unit 630 authenticates whether the developer cartridge is genuine based on the identification information of the developer cartridge and the identification information table stored in the storage unit 300. "Genuine" means that the developer cartridge has been manufactured by a qualified manufacturer and assigned valid identification information. The identification information of the genuine developer cartridge is stored in advance in the identification information table.

For example, when the identification information of the identification information table matches the identification information of the developer cartridge, the authentication unit 630 authenticates the developer cartridge is genuine. For example, when the identification information of the identification information table does not match the identification information of the developer cartridge, the authentication unit 630 authenticates the developer cartridge is not genuine.

Based on a determination result of the determination unit 620, the authentication unit 630 determines whether an authentication process for the developer cartridge is performed. When it is determined that the target object approaches during the power-saving period, the authentication unit 630 performs the authentication process for the developer cartridge. When it is determined that the target object does not approach during the power-saving period, the authentication unit 630 does not perform the authentication process for the developer cartridge.

The initialization unit 640 deletes the flag and the detection time of the detection history table stored in the storage unit 300.

The operation control unit 650 controls an operation of the image forming apparatus 100 to at least one of the normal state and the power-saving state. For example, the operation control unit 650 causes the image forming apparatus 100 to transition from the normal state to the power-saving state when the image forming apparatus 100 is not used for a predetermined time. For example, the operation control unit 650 causes the image forming apparatus 100 to transition from the power-saving state to the normal state, based on a notification such as a printing instruction or an input by a user.

FIG. 5 is a diagram of a method of detecting a user using the sensor 150 according to the embodiment.

In FIG. 5, the sensor 150 is provided in the image forming apparatus 100. In FIG. 5, for example, a detection range 10 of the sensor 150 is indicated by a circle. A region of the detection range 10 may be within a maximum detection range which can be detected by the sensor 150. A method in which the sensor 150 detects a user 15 will be described below.

When the user 15 is within the range of the detection range 10 of the sensor 150, the sensor 150 detects the user 15. At this time, the acquisition unit 610 acquires a time at which the user 15 is detected. When the user 15 is out of the region of the detection range 10 of the sensor 150, the sensor 150 does not detect the user 15.

Figure 6:
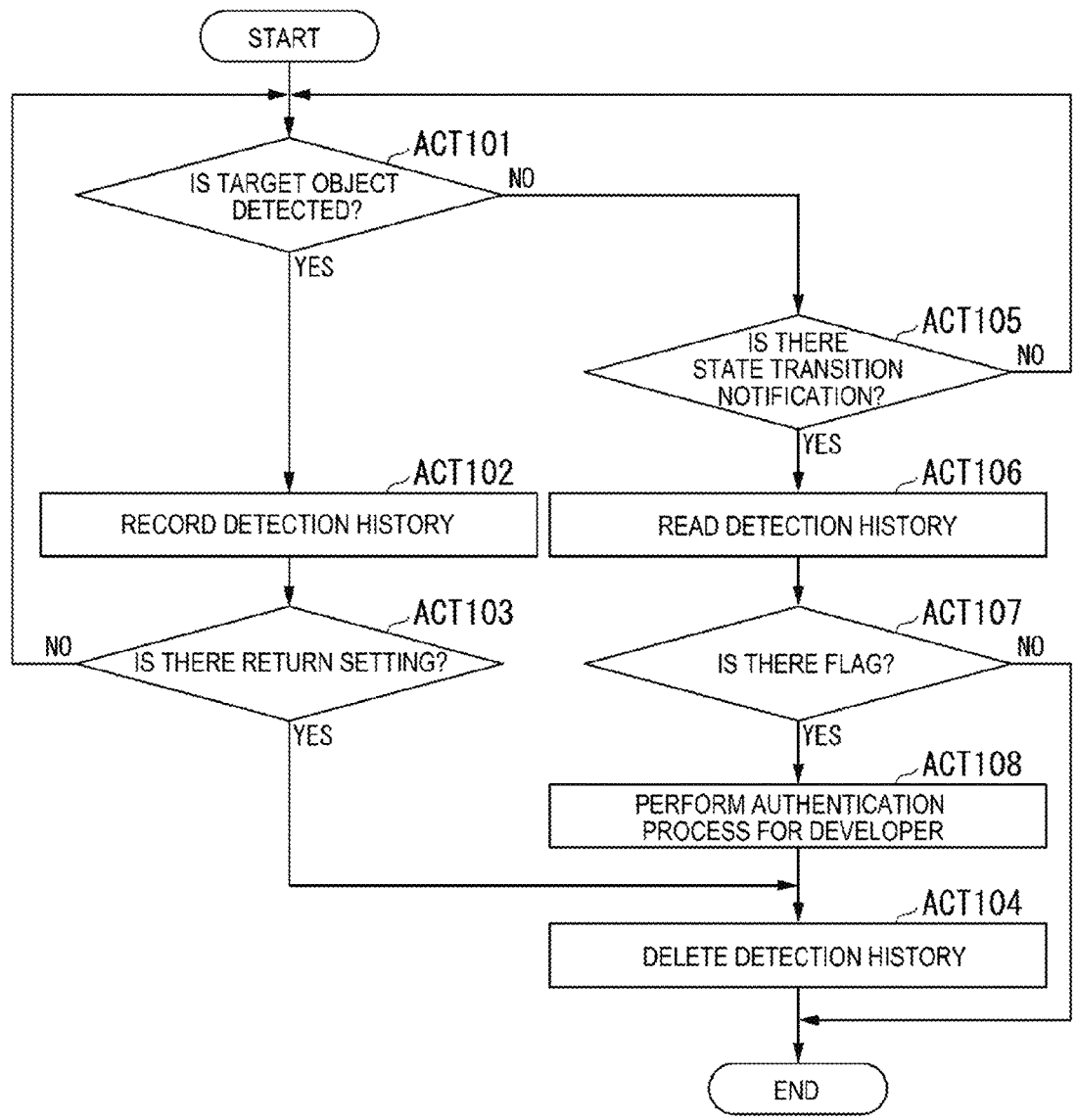
FIG. 6 is a flowchart of a process causing a power-saving state to transition to a normal state according to the embodiment.

FIG. 6 is a flowchart of a process causing a power-saving state to transition to a normal state according to the embodiment. In the power-saving state, the image forming apparatus 100 stats a process in accordance with the flow of the flowchart of FIG. 6. In the normal state, the image forming apparatus 100 does not start the process of the flowchart of FIG. 6.

The sensor 150 detects whether a target object is in the detection range (ACT 101). When the sensor 150 detects the target object (YES in ACT 101), the storage unit 300 records a flag in the detection history table (ACT 102).

The determination unit 620 determines whether the return setting is recorded on the storage unit 300 (ACT 103). When the return setting is not recorded (NO in ACT 103), the process transitions to ACT 101. When the return setting is recorded (YES in ACT 103), the initialization unit 640 deletes the flag and the detection time stored in the storage unit 300 (ACT 104). Thereafter, the operation control unit 650 causes the image forming apparatus 100 to transition from the power-saving state to the normal state.

When the sensor 150 does not detect the target object (NO in ACT 101), the image forming apparatus 100 waits for a state transition notification for transition from the power-saving state to the normal state (ACT 105). When there is no state transition notification (NO in ACT 105), the image forming apparatus 100 transitions to the process of ACT 101. When there is the state transition notification (YES in ACT 105), the acquisition unit 610 reads the detection history table from the storage unit 300 (ACT 106).

The determination unit 620 determines whether a target object approaches the image forming apparatus 100 during the power-saving period based on presence or absence of a record during the power-saving period (ACT 107). When the target object does not approach the image forming apparatus 100 during the power-saving period (NO in ACT 107), the authentication unit 630 does not perform the authentication process. Thereafter, the operation control unit 650 controls an operation from the power-saving state to the normal state. When the target object approaches the image forming apparatus 100 during the power-saving period (YES in ACT 107), the authentication unit 630 performs the authentication process (ACT 108). Since the authentication process of the authentication unit 630 has been described above, the description thereof will not be repeated. Thereafter, the process of ACT 104 is performed and the operation control unit 650 controls the operation from the power-saving state to the normal state.

The image forming apparatus 100 with the foregoing configuration includes the storage unit 300 and the authentication unit 630, and thus it is possible to authenticate whether the developer cartridge is genuine. The storage unit 300 stores the detection history table and the identification information table. Based on the identification information table, the authentication unit 630 authenticates whether the developer cartridge is genuine. Based on the detection history table, the determination unit 620 determines whether a target object approaches during the power-saving period. When the target object does not approach during the power-saving period, the authentication unit 630 does not authenticate the developer cartridge. Thus, the image forming apparatus 100 can reduce a transition time from the power-saving state to the normal state.

MODIFICATION EXAMPLES

The printer 130 may perform printing using ink other than toner. In this case, the developer cartridge may be mounted as, for example, an ink cartridge. The printer 130 performs printing, for example, by causing ink to be formed as fine droplets and directly spraying the fine droplets to a printing medium. Examples of the ink include dye ink and pigment ink. In printing performed using dye ink, dye of the ink soaks in the printing medium to be fixed. In printing performed using pigment ink, pigment of the ink dispersing in water is attached and fixed to the surface of the printing medium by evaporating the water.

When the developer cartridge used in the image forming apparatus is not genuine, the authentication unit 630 may give a warning to the user.

The image forming apparatus 100 may not perform the process of the determination unit 620. When the sensor 150 detects a target object during the power-saving state, the authentication unit 630 may authenticate whether the developer cartridge is genuine at the time of transition to the normal state.

The authentication unit 630 may authenticate whether the developer cartridge is genuine based on the shape of the developer cartridge. For example, the shape of a connection portion of the developer cartridge may be a shape of a key and the developer cartridge may be authenticated as being genuine when the shape is connected to the mounting unit 131.

The authentication unit 630 does not perform the authentication process for the developer cartridge when it is determined that the target object does not approach during the power-saving period.

The sensor 150 may not be provided in the image forming apparatus 100. That is, the sensor 150 may be installed outside of the image forming apparatus 100 and in the periphery of the image forming apparatus 100. The image forming apparatus 100 can perform a process similar to the aforementioned embodiments by acquiring a detection result from the external sensor 150.

The storage unit 300 may not be provided in the image forming apparatus 100. The image forming apparatus 100 may acquire the identification information table and the detection history table from an external storage unit via the network 900. Modification examples will be described below with reference to the drawings.

Figure 7:
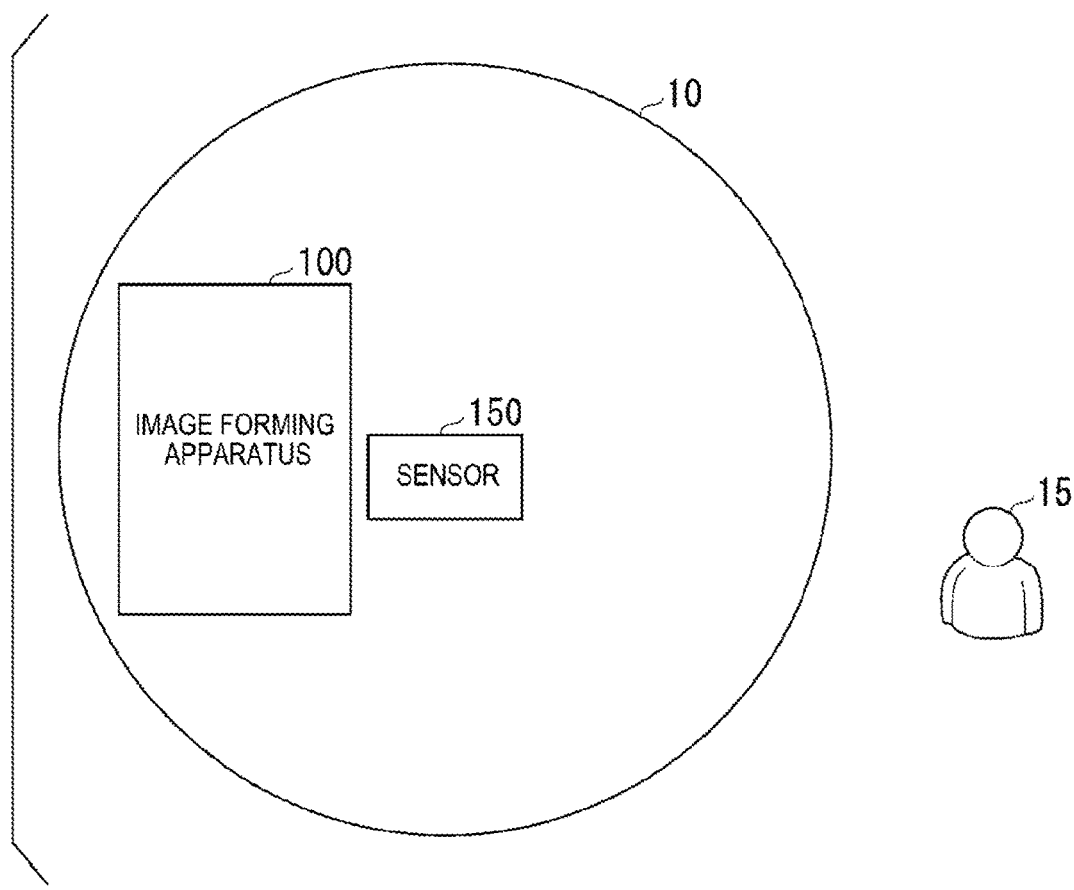
FIG. 7 is a diagram of a method of detecting a user using an external sensor according to a modification example.

FIG. 7 is a diagram of a method of detecting a user using the external sensor 150 according to a modification example. The description of the same content as the content described in FIG. 4 will not be repeated.

The sensor 150 provided outside of the image forming apparatus 100 detects whether the sensor 15 is in the region of the detection range 10. The communication unit 160 acquires a detection result from the sensor 150. The authentication unit 630 performs the authentication process for the developer cartridge based on the acquired detection result. The sensor 150 may be provided outside of the image forming apparatus 100 and the plurality of sensors 150 may be provided in the periphery of the image forming apparatus 100.

The image forming apparatus 100 may acquire detection results from all the provided sensors 150 when the plurality of sensors 150 is provided. The communication unit 160 may select any sensor 150 from the plurality of sensors 150 and acquire a detection result. Based on the detection results of the plurality of sensors 150, the determination unit 620 may determine how closely a target object approaches the image forming apparatus 100.

Figure 8:
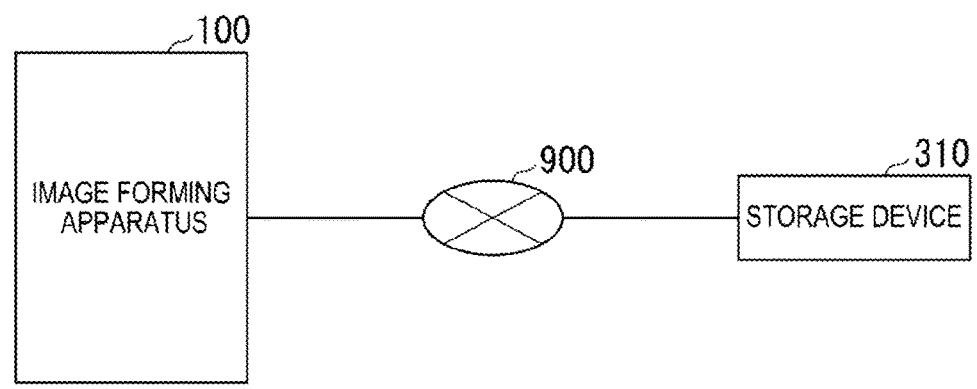
FIG. 8 is a diagram illustrating an authentication process using an external storage device according to a modification example.

FIG. 8 is a diagram illustrating a specific example of an authentication process using an external storage device according to a modification example.

The image forming apparatus 100 may communicate with the storage device 310 via the network 900. The storage device 310 stores at least one of the identification information table and the detection history table. The communication unit 160 acquires at least one of the identification information table and the detection history table from the storage device 310. Based on the identification information table recorded on the storage device 310, the authentication unit 630 may authenticate whether a developer cartridge is genuine.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
   a sensor configured to detect an object within a predetermined range;
   a storage unit that stores information about the detected object; and
   a controller configured to
      when the image forming apparatus is in a first mode, control the sensor to detect the object, and in response to the detection of the object, store the information indicating that the object is detected, and
      in response to transition from the first mode to a second mode in which power consumption is higher than the first mode,
         when the information indicates that the object is detected, perform authentication of a developer cartridge attached to the image forming apparatus, and
         when the information does not indicate that the object is detected, skip the authentication of the developer cartridge.

2. The image forming apparatus according to claim 1, wherein the first mode is a power-saving mode and the second mode is a normal mode.

3. The image forming apparatus according to claim 1, wherein
   the controller is configured to
      acquire a first identification of a genuine developer cartridge and a second identification from the developer cartridge attached to the image forming apparatus, and
      determine the attached developer cartridge as the genuine developer cartridge when the first and the second identification are identical.

4. The image forming apparatus according to claim 3, wherein
   the storage unit stores information about the first identification.

5. The image forming apparatus according to claim 1, wherein
   the controller is configured to determine whether the object approaches the image forming apparatus based on the detection result.

6. The image forming apparatus according to claim 5, wherein
   if the sensor detects the object in the first mode, the controller determines that the object approaches the image forming apparatus, and performs the authentication of the developer cartridge attached to the image forming apparatus.

7. The image forming apparatus according to claim 6, wherein
   if the sensor does not detect the object in the first mode, the controller determines that the target object does not approach the image forming apparatus, and does not perform the authentication of the developer cartridge attached to the image forming apparatus.

8. The image forming apparatus according to claim 1, wherein
   the sensor is one of: an infrared sensor, an optical sensor, an acoustic sensor, a sound sensor, and a touch sensor.

9. The image forming apparatus according to claim 1, wherein
   the developer cartridge contains a decolorable toner.

10. The image forming apparatus according to claim 1, wherein
    the controller is configured to delete the information indicating that the object is detected after the authentication of the developer cartridge.

11. An image forming system comprising:
    a sensor configured to detect an object within a predetermined range; and
    an image forming apparatus comprising:
       a storage unit that stores information about the detected object; and
       a controller configured to
          when the image forming apparatus is in a first mode, control the sensor to detect the object, and in response to the detection of the object, store the information indicating that the object is detected, and
          in response to transition from the first mode to a second mode in which power consumption is higher than the first mode,
             when the information indicates that the object is detected, performing authentication of a developer cartridge attached to the image forming apparatus, and
             when the information does not indicate that the object is detected, skip the authentication of the developer cartridge.

12. The image forming system according to claim 11, wherein the first mode is a power-saving mode and the second mode is a normal mode.

13. The image forming system according to claim 11, wherein
    the controller is configured to
       acquire a first identification of a genuine developer cartridge and a second identification from the developer cartridge attached to the image forming apparatus, and
       determine the attached developer cartridge as the genuine developer cartridge when the first and the second identification are identical.

14. The image forming system according to claim 13, wherein
    the storage unit stores information about the first identification.

15. The image forming system according to claim 11, wherein
    the controller is configured to determine whether the object approaches the image forming apparatus based on the detection result.

16. The image forming system according to claim 15, wherein
if the sensor detects the object in the first mode, the controller determines that the object approaches the image forming apparatus, and performs the authentication of the developer cartridge attached to the image forming apparatus.

17. The image forming system according to claim 16, wherein
if the sensor does not detect the object in the first mode, the controller determines that the target object does not approach the image forming apparatus, and does not perform the authentication of the developer cartridge attached to the image forming apparatus.

18. The image forming system according to claim 11, wherein
the sensor is one of: an infrared sensor, an optical sensor, an acoustic sensor, a sound sensor, and a touch sensor.

19. The image forming system according to claim 11, wherein the developer cartridge contains a decolorable toner.

20. A method carried out by an image forming apparatus, the method comprising:
monitoring presence of an object within a predetermined range using a sensor in a first mode;
when the presence of the object is detected, storing in a storage unit information indicating that the object is detected; and
in response to occurrence of a predetermined event, switching from the first mode to a second mode where power consumption is higher than the first mode; and performing authentication of a developer cartridge attached to the image forming apparatus if the stored information indicates that the object is detected.

* * * * *